April 5, 1932.   A. H. LEIPERT   1,852,464

MOVABLE CAB FOR MOTOR VEHICLES

Filed April 9, 1931   3 Sheets-Sheet 1

INVENTOR
August H. Leipert,
BY
Redding, Greeley, O'Shea & Campbell
HIS ATTORNEYS April 5, 1932.  A. H. LEIPERT  1,852,464
MOVABLE CAB FOR MOTOR VEHICLES
Filed April 9, 1931   3 Sheets-Sheet 2
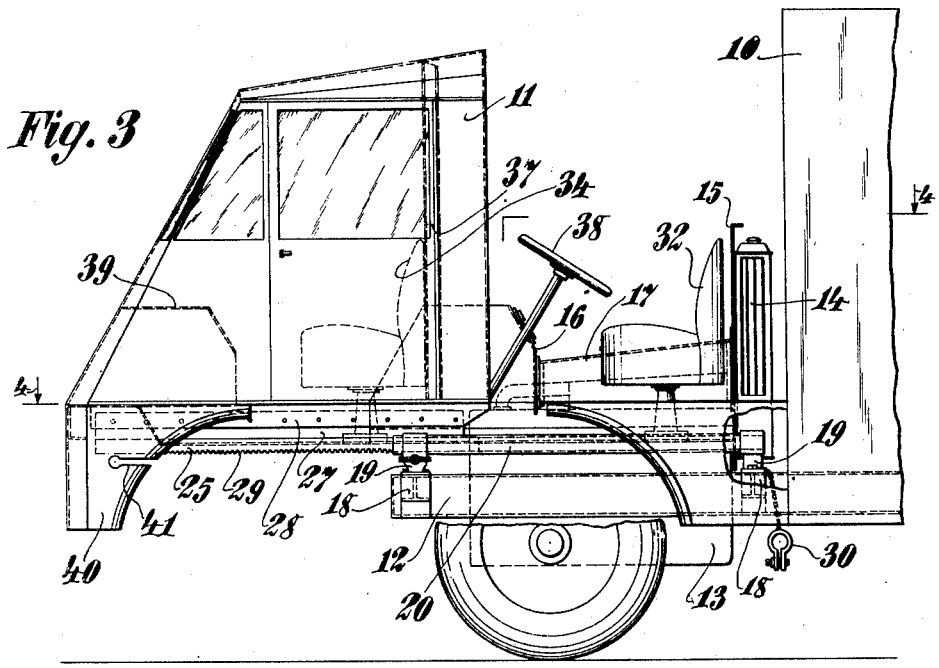
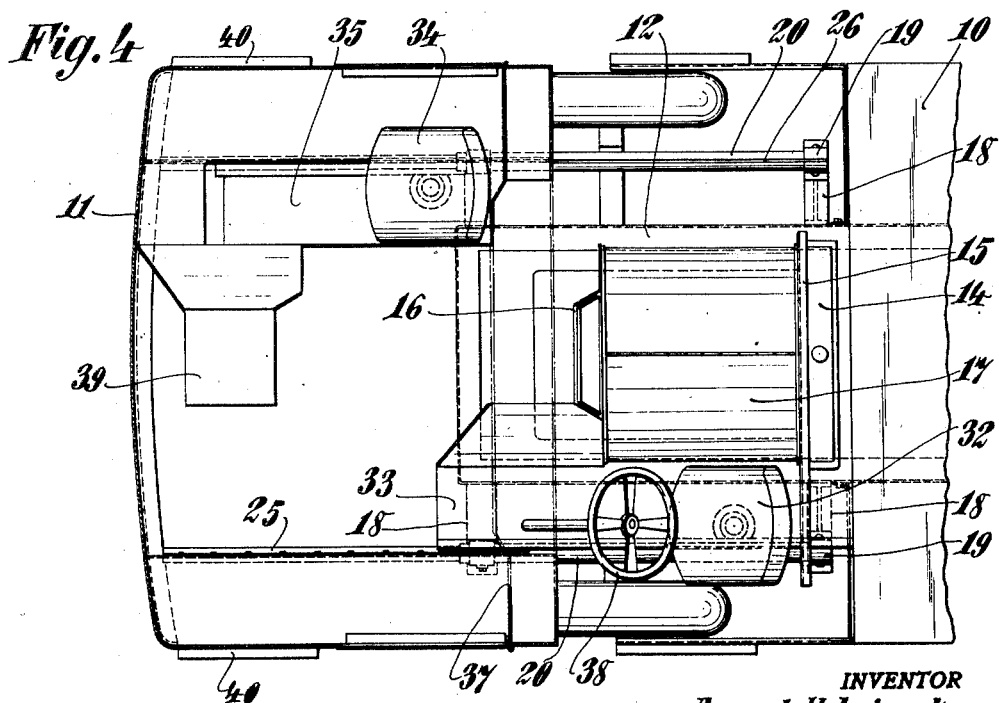
INVENTOR
August H. Leipert,
BY
Redding, Greeley, O'Shea & Campbell
HIS ATTORNEYS April 5, 1932.   A. H. LEIPERT   1,852,464
MOVABLE CAB FOR MOTOR VEHICLES
Filed April 9, 1931   3 Sheets-Sheet 3
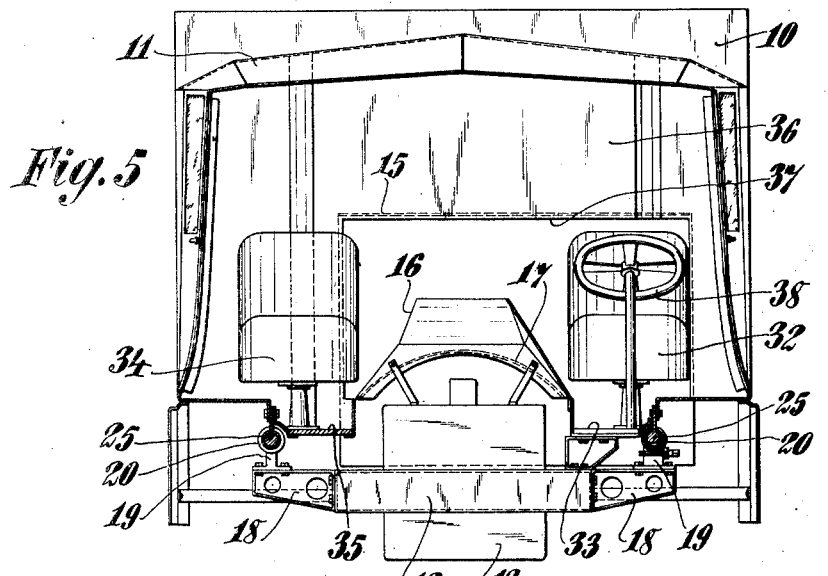
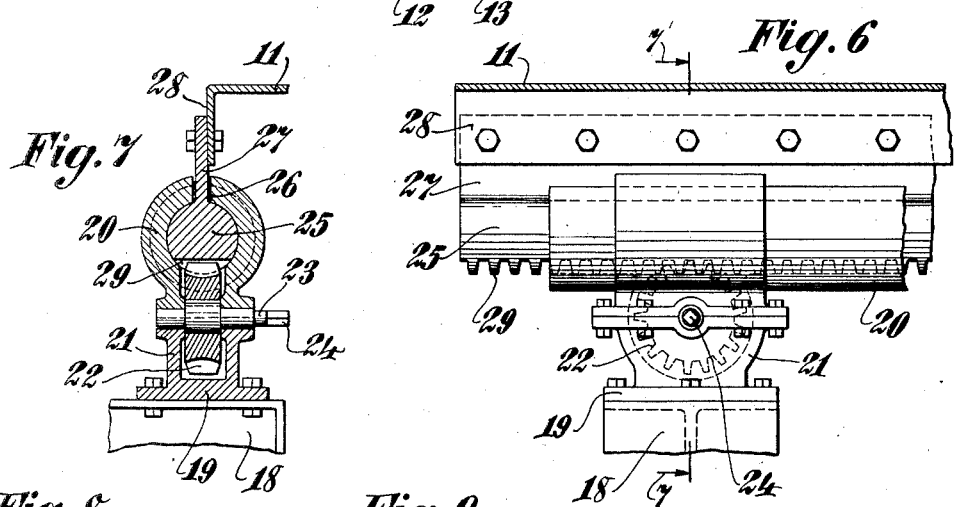
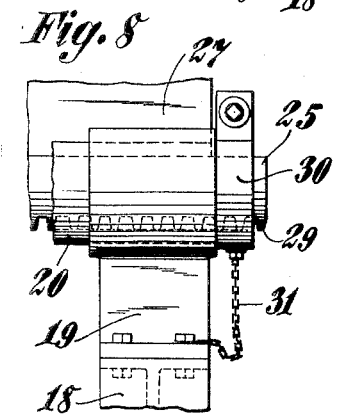
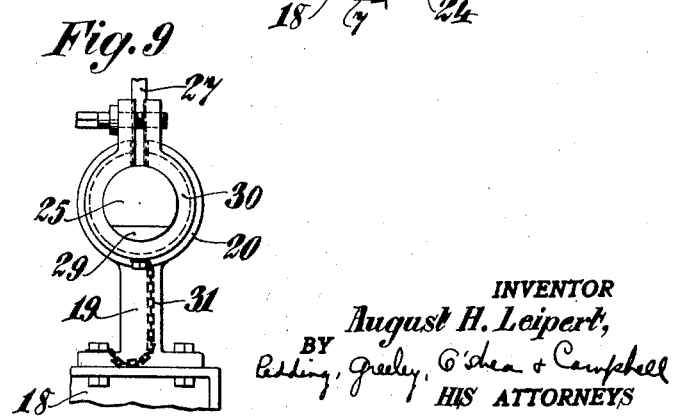
INVENTOR
August H. Leipert,
HIS ATTORNEYS Patented Apr. 5, 1932

1,852,464

UNITED STATES PATENT OFFICE

AUGUST H. LEIPERT, OF COLLEGE POINT, NEW YORK, ASSIGNOR TO INTERNATIONAL MOTOR COMPANY, OF NEW YORK, N. Y., A CORPORATION OF DELAWARE

MOVABLE CAB FOR MOTOR VEHICLES

Application filed April 9, 1931. Serial No. 528,751.

The present invention relates to motor vehicle constructions and embodies, more specifically, an improved cab construction for motor vehicles of the commercial type, this cab being of such character as to enclose entirely the engine and controlling mechanism, the driver and attendant being seated within the cab preferably upon opposite sides of the engine.

More specifically, the invention includes a construction of the above character, wherein provision is made for moving the cab in such fashion as to expose completely the engine and controlling elements in order that they may be conveniently installed and serviced.

There has recently been developed a type of cab which completely encloses the engine and controlling mechanisms of the motor vehicle, placing the driver and attendant alongside of the engine and thus increasing the available pay load or platform area of the chassis. Where the elements are disposed in this fashion, they are quite compact and the installation and repair thereof requires free accessibility in order that the job may be commercially successful. An object of the present invention, accordingly is to provide a cab construction of this character, wherein free accessibility is provided for all of the controlling mechanism as well as the engine.

A further object of the invention is to provide a cab of the above character which may be conveniently moved into such position that the engine and associated elements may be fully exposed and conveniently inspected.

A further object of the invention is to provide a device of the above character, wherein the dash, engine and radiators are rigidly secured to the chassis and the cab is so constructed that it is adapted to cooperate with these elements to permit the cab to be moved forwardly hereof and out of the vertical planes thereof to permit accessibility for inspection and repair.

Further objects in the details of construction will be readily apparent as the description of the invention proceeds and reference will now be had to the accompanying drawings, wherein:

Figure 3 is a view similar to Figure 1, showing the cab moved forwardly to a position, wherein the engine and associated mechanism may be conveniently inspected and repaired.

Figure 4 is a view in section, taken on line 4—4 of Figure 3, and looking in the direction of the arrows.

Figure 5 is a view in section, taken on a transverse plane through the cab and looking rearwardly to show the elements thereof.

Figure 6 is a detail view showing the mechanism for moving the cab from its normal position to its extended position.

Figure 7 is a view in section, taken on line 7—7 of Figure 6, and looking in the direction of the arrows.

Figure 8 is a detail view showing the manner in which the cab is secured in position.

Figure 9 is an end view of the mechanism shown in Figure 8.

Figure 1:
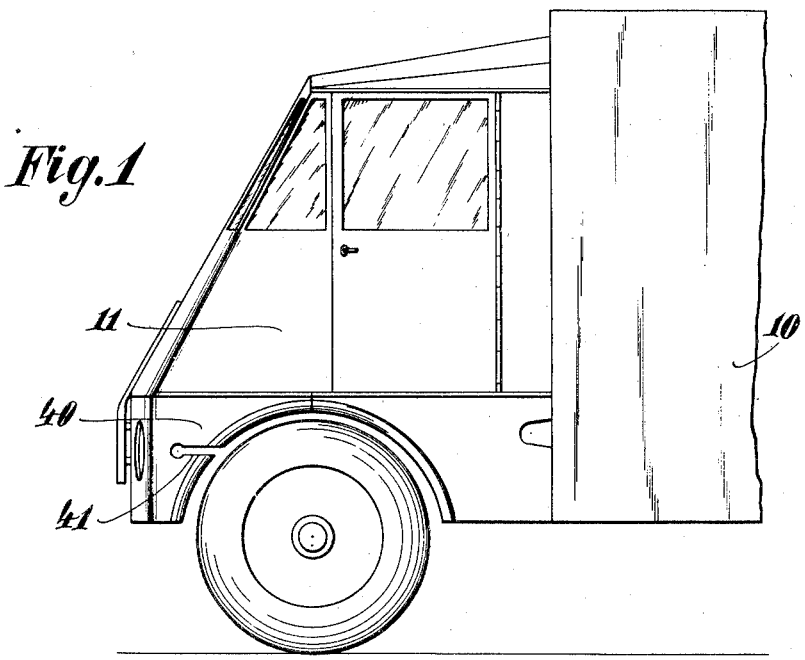
Figure 1 is a view in side elevation, showing a vehicle cab constructed in accordance with the present invention.
Figure 2:
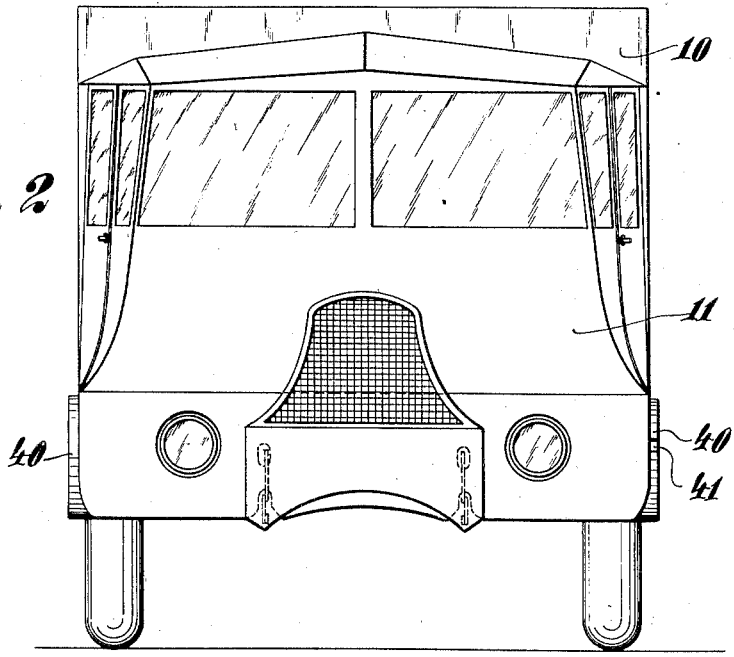
Figure 2 is a view in front elevation of the cab of Figure 1.

With reference to the above drawings, a motor vehicle is shown at 10, having a cab 11 and side frame members 12. The side frame members preferably support the engine 13 and carry the radiators 14, rear dash 15 and front dash 16. A removable hood 17 extends between these dashes and encloses the engine to reduce heat radiation therefrom into the cab 11.

Upon the side frame members 12 outrigger brackets 18 are mounted, these brackets carrying pedestals 19 upon which tubular channels 20 are secured. The pedestals 19 at one side of the frame are formed with housings 21 within which a gear 22 is mounted upon a shaft 23. The end of shaft 23 is squared at 24 to receive any suitable wrench for turning the shaft and gear 22.

Within the tubular channels 20, cylindrical shafts 25 are slidably received, the channels 20 being slotted at 26 and the shafts 25 being provided with upwardly extending flanges 27 upon which the cab 11 is mounted by means of flanges 28.

It will thus be seen that rotation of the shaft 23 moves the shafts 25 within the tubular channels 20 and thus advances the cab from a normal position, such as shown in Figure 1, to an extended position, as shown in Figure 3. The lower extremity of the shaft 25 which cooperates with the gear 22 is, of course, formed with teeth 29 in order that such operation may be effected.

A suitable clamp 30 is provided for engaging the end of one of the shafts 25 rearwardly of one of the rear pedestals 19. When this clamp is applied to the shaft, movement of the latter is prevented and the cab is thus effectively locked in its normal position. A chain 31 preferably secures clamp 30 to the adjacent pedestal in order that the clamp may not be lost.

A drivers seat 32 is mounted upon a stationary floor 33 carried by the chassis while the attendant's seat 34 is mounted upon the floor 35 of the movable cab and advances therewith as clearly shown in Figure 3. The rear wall 36 of the cab is provided with an aperture 37 which is adapted to cooperate with the rear dash 15 and provides a continuous rear dash for the control compartment within the cab when the latter is in its normal position. The aperture 37 is of such size as to enable it to clear the operator's seat 32 and the steering column and wheel 38 in order that the cab may be advanced to its extended position. Forwardly in the cab, a cooperating wall or partition member 39 is provided for cooperating with the forward dash 16 to afford a complete closure for the forward portion of the engine in order that a fan may be provided to direct cooling air over the engine and within the hood 17. The forward apron or mud guard 40 is preferably carried by the cab and thus advances therewith to expose the steering mechanism for convenient inspection. This apron or guard is provided with a slot 41 to afford access to the squared shaft 23 in order that the cab may be moved as outlined above.

While the invention has been described with specific reference to the accompanying drawings, it is not to be limited, save as defined in the appended claims.

I claim as my invention:

1. In combination with a vehicle frame, a cab slidably mounted thereon for forward longitudinal movement, a seat mounted on the frame and within the cab when the latter is in a normal position, and a seat mounted within the cab and movable therewith.

2. In combination with a vehicle frame, an engine mounted thereon, a front dash, a radiator mounted rearwardly of the engine, a rear dash separating the radiator and engine, and a hood over the engine and mounted between the dashes, a cab adapted to enclose the engine and radiator, partitions on the cab adapted to cooperate with the dashes to prevent communication between the interior of the cab and the engine and radiators, and means to mount the cab slidably on the frame.

3. In combination with a vehicle frame, an engine mounted thereon, a front dash, a radiator mounted rearwardly of the engine, a rear dash separating the radiator and engine, and a hood over the engine and mounted between the dashes, a cab adapted to enclose the engine and radiator, partitions on the cab adapted to cooperate with the dashes to prevent communication between the interior of the cab and the engine and radiator, means to mount the cab slidably on the frame, a seat mounted on the frame and within the cab, and a seat mounted within the cab and slidable therewith.

This specification signed this 6th day of April, A. D. 1931.

AUGUST H. LEIPERT.